United States Patent Office 3,169,873
Patented Feb. 16, 1965

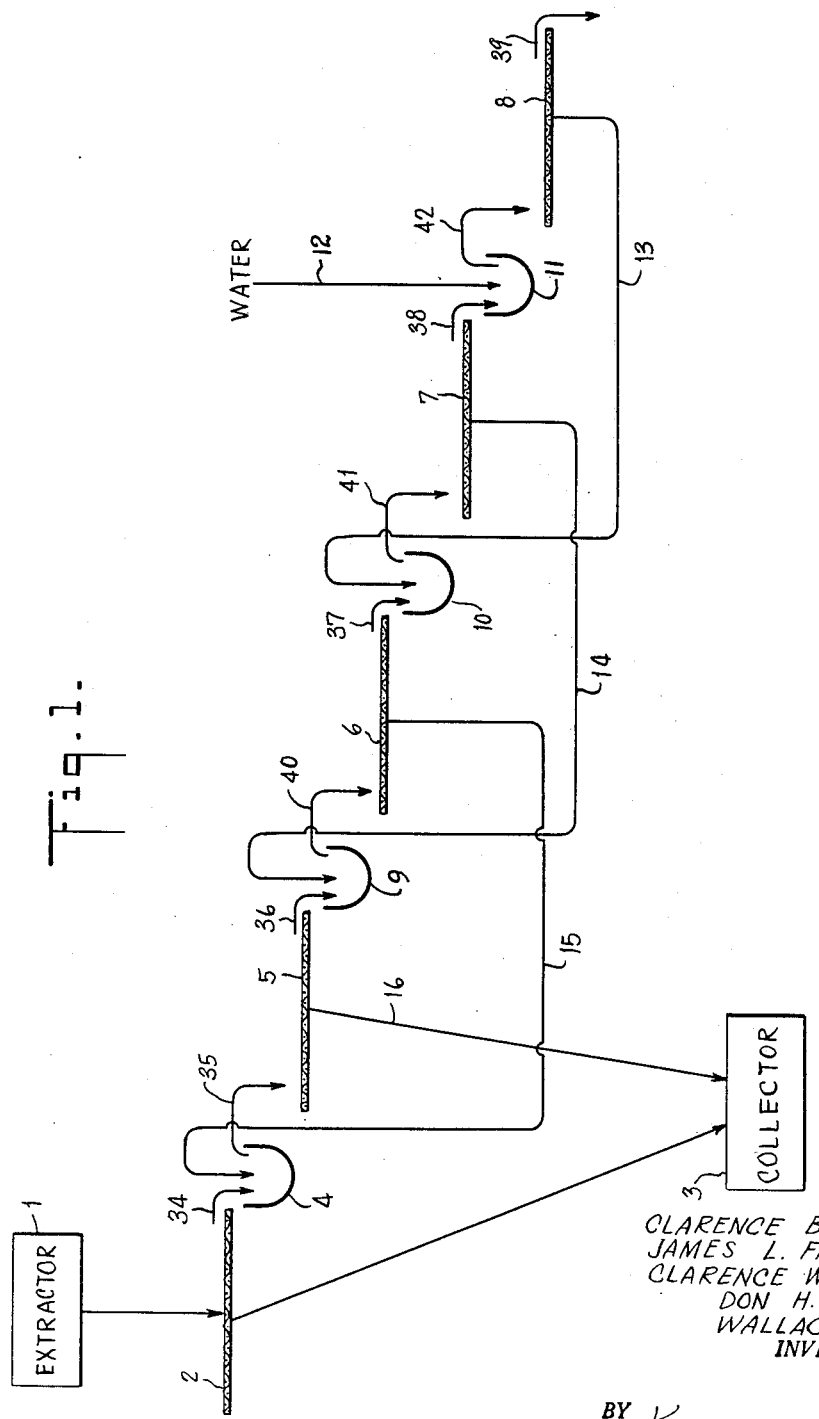

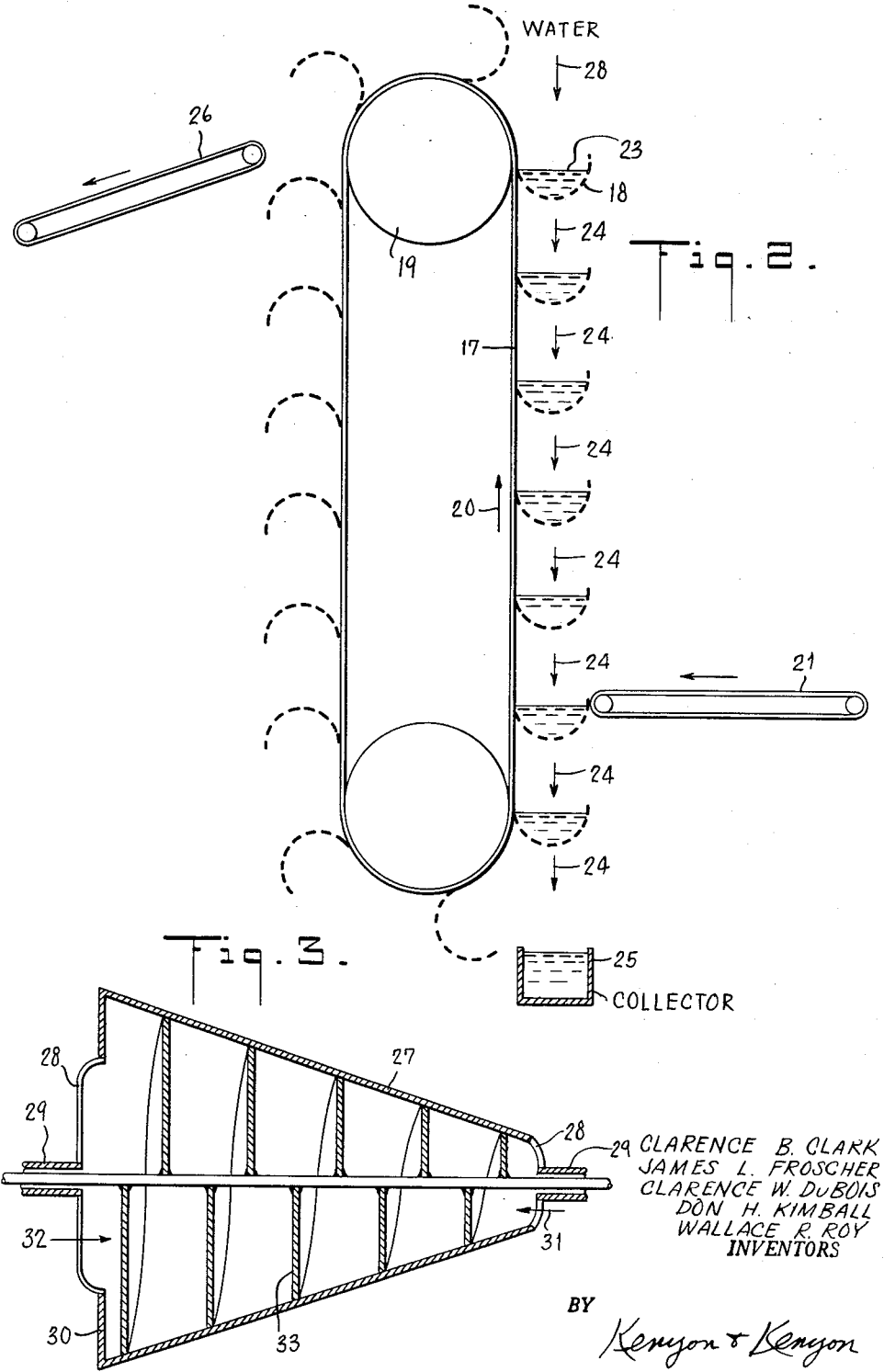

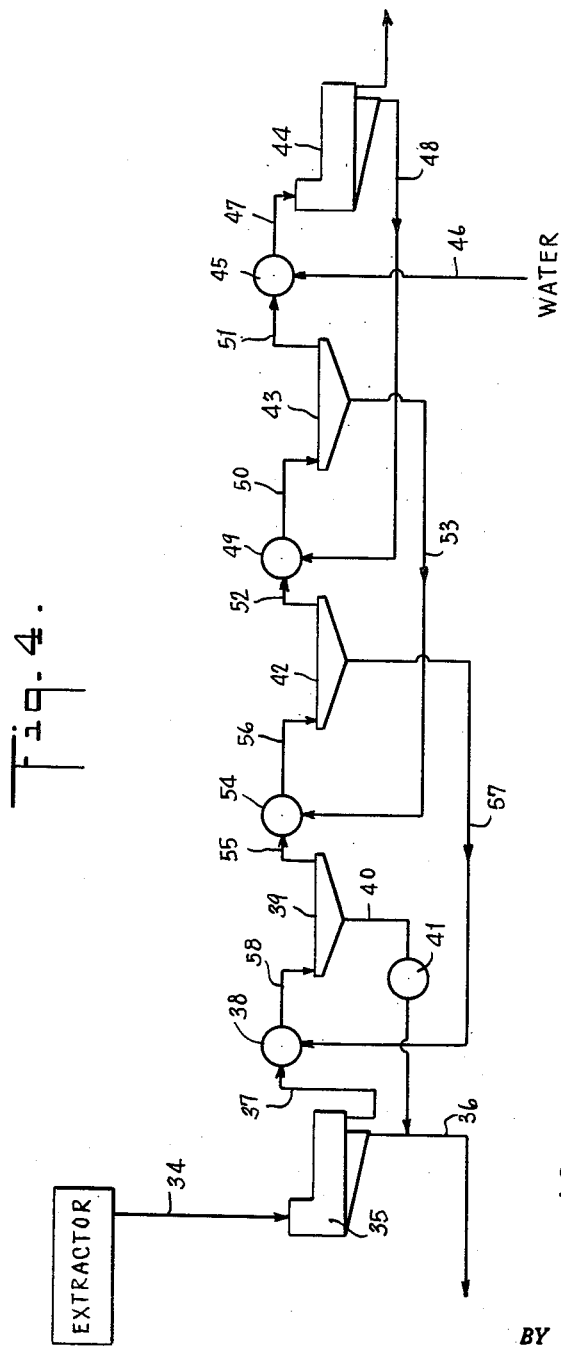

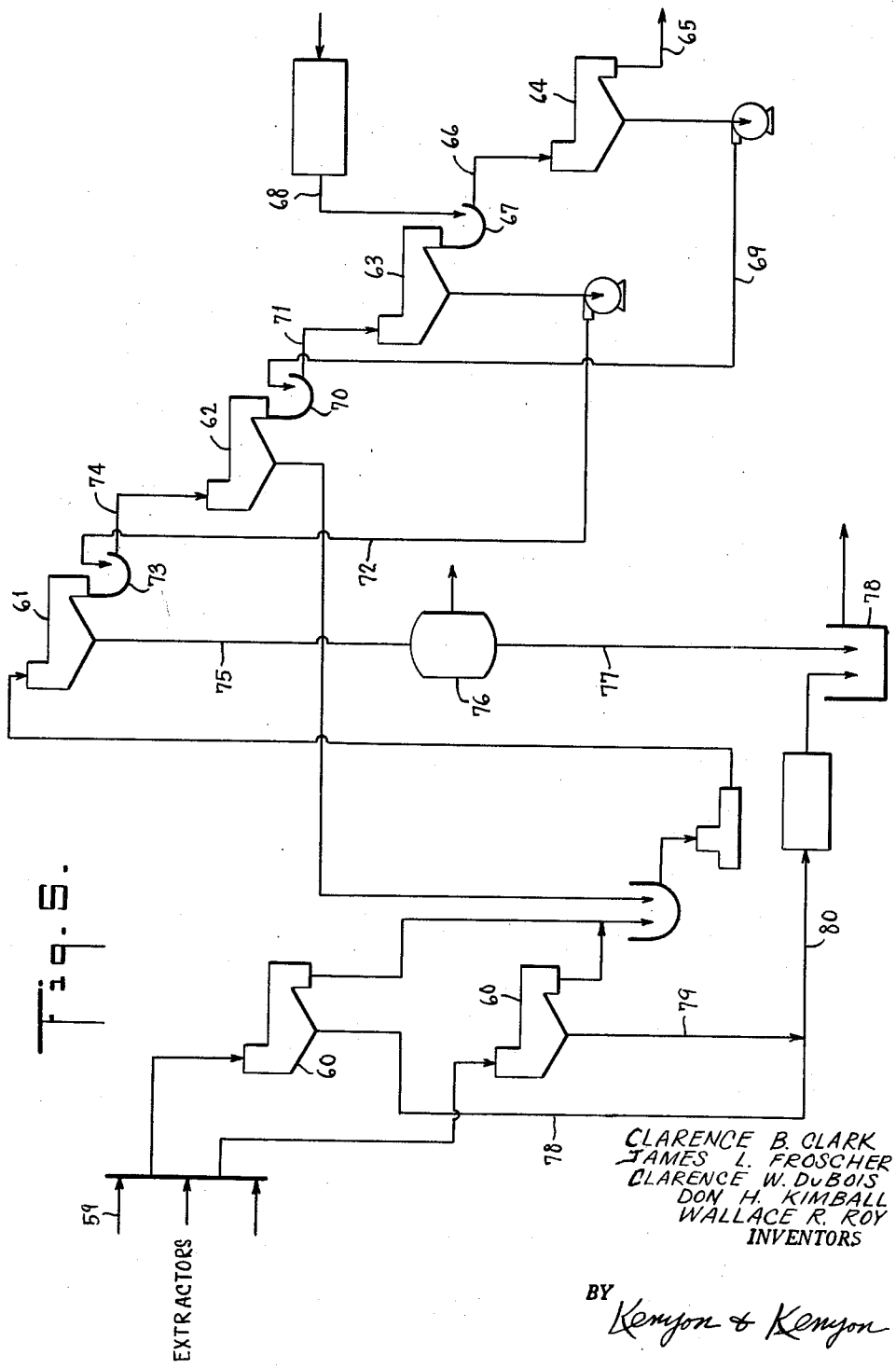

3,169,873
PROCESS FOR EXTRACTING FRUIT JUICES
Clarence B. Clark, P.O. Box 645, Fern Park, Fla.; James L. Froscher, P.O. Box 513, Apopka, Fla.; Clarence W. Du Bois, 926 Maxwell Ave., Orlando, Fla.; Don H. Kimball, 1406 Normandy Drive, Mount Dora, Fla.; and Wallace R. Roy, 1315 Lancaster Drive, Orlando, Fla.
Filed June 19, 1959, Ser. No. 821,475
16 Claims. (Cl. 99—105)

This application is a continuation-in-part of application Serial No. 646,584, filed March 18, 1957, for Process for Extracting Fruit Juices, now abandoned.

The invention relates to the extraction of juice from fruit or vegetables and particularly to the extraction of juice from citrus fruit and primarily for concentration.

The first step of the present day practice of extracting citrus juice from fruit consists in subjecting the fruit to the action of an extractor. In the extractor the peel is separated from the pulp which consists of the seeds, the membrane which separates the segments of the fruit and the juice cells, many of which are ruptured during this procedure or in the later handling of the pulp. Thereafter the juice which contains water soluble solids is separated from the pulp. However, this last separation is not necessarily complete since some of the cells may be found in the final product.

For economic reasons, it is encumbent upon the extractor to extract substantially all of the juice from the pulp and this is customarily achieved with finishers which are basically high pressure screw presses which squeeze the pulp rather drastically, and many times tear and abrade it so as to produce finely divided pulp which finds its way into the finished product. The result of this is that although substantially all of the liquid carrying the water soluble solids is extracted leaving a very dry pulp which is macerated and squeezed to such an extent that undesirable quantities of pectin, enzymes and bitter principles found in the pulp and the very finely divided pulp above referred to, find their way into the juice.

When the finishing operation is carried to the point where economic quantities of juice are extracted, the quantities of the undesirable constituents often run high enough to give the juice undesirable characteristics and a relatively high viscocity so that it can only be concentrated to from 28 to 30° Brix.

In contrast to the aforesaid method, when juice is extracted according to the present method, it is possible to extract the desirable water soluble constituents from the pulp substantially quantitatively. This may be done without drastically squeezing or macerating the pulp and without producing significant quantities of finely divided pulp and without extracting undesirable quantities of pectins, enzymes and bitter principles, and without increasing the viscosity so as to create serious problems when the juice is concentrated to make frozen concentrated juice, which is the form in which much of the juice is now marketed.

One of the objects of the present invention is to provide a new process of juice extraction which overcomes the aforesaid difficulties.

Another object is to provide such a process in which the water soluble constituents, which in the case of orange juice are referred to as orange solids, are extracted to a greater extent than heretofore.

Another object is to provide such a method in which the orange solids are extracted without extracting undesirable quantities of the other constituents which may be undersirable.

Another object is to provide such a method in which the soluble solids are extracted by means of an aqueous medium.

Another object is to provide such a method in which the final juice product is kept substantially free of finely divided pulp.

Another object is to provide such a method in which the total juice recovery is essentially greater than heretofore while maintaining the juice at a high quality and at viscosities which do not interfere with further concentration.

Another object of the invention is to provide such a method in which the drastic squeezing and macerating finishing operations heretofore mentioned are eliminated without however lowering the recovery of soluble solids.

Another object is to provide a process in which maximum quantities of high quality juice are extracted easily, simply and inexpensively.

Other objects and advantages of the invention will be apparent from the following specification and the accompanying drawings in which illustrative processes are shown diagrammatically.

The present process consists essentially in first separating the peel from the pulp, then separating the juice and the soluble solids from the pulp without drastically squeezing or macerating the pulp.

This may be done by gravity separation or by centrifugal separation and may be either a step-by-step or a continuous process.

The first step is generally that of separating free juice from the pulp as it comes from the extractor. Such juice is generally at about 12° Brix.

The pulp from which the juice has been separated without pressing is then washed either in a plurality of successive washings after each of which the washing liquid is separated from the pulp without pressing or macerating, or as will be described in detail later, through a continuous countercurrent flow type of extraction.

When the process is carried out in a series of steps the pulp is first drained of the juice which can be easily separated. Thereafter, the pulp is washed in a plurality of successive washings and the washing liquid is separated without excessively pressing or mascerating the pulp.

In the preferred form of the invention the washing water from the last step is utilized successively for the next preceding steps, so that the final liquid from the washings contains substantially all of the water soluble solids left in the pulp after the first free juice is eliminated. This washing liquid is then either processed or added to the juice taken from the pulp in the first step.

In some forms of the process the washing liquid is centrifuged to remove any fine pulp which might be entrained in it before it goes to the final product.

When a continuous countercurrent flow process is employed, the pulp is introduced at one end of the process, so to speak, and the washing liquid at the other end. They flow counter to one another so that at one the pulp is discharged while at the other end the liquid containing the extracted solids is collected for processing or addition to the initially extracted juice.

Generally, the washing process is carried out with a quantity of aqueous liquid, equal in weight to the weight of the pulp and in the preferred form of the invention the liquid employed is liquid condensate recovered from the concentration of juice because this liquid has in it many of the volatile constituents of the juice which are thus returned to the juice.

In carrying out the step-by-step process the liquid is mixed with the pulp which has already been washed in several separate successive stages. It is then drained from this pulp after which it is mixed with the pulp from the next succeeding washing and draining step. After this mixing it is drained or separated from the pulp and carried to the next preceding step repeating essentially the same steps.

Throughout, in the preferred form of the invention, both the juice and the extracting liquid are separated from the pulp without materially pressing or macerating the pulp. This permits the liquid to dissolve the water soluble constituents from the pulp without picking up undesirable quantities of the above mentioned undesirable elements present in the pulp.

The liquid is relatively free from the undesirable pectins and other constituents which are normally extracted when the pulp is subjected to the customary finishing operations. Its viscosity is such that it can be concentrated by vacuum without the difficulties attendant upon the concentration of more viscous citrus juice from the customary finishing operation.

The extraction of the liquid from the pulp may be performed on devices which are normally uesd to finish the pulp. However, when this is done care is taken to see that the pulp is not subjected to the pressing and maceration which accompanies the ordinary finishing operation heretofore carried out and it is preferred that when this is done the washing liquid be centrifuged to remove any entrained pulp fines before returning the washings to the final product.

In the drawings:

FIG. 1 illustrates diagrammatically one form of process embodying the invention;

FIG. 2 illustrates diagrammatically another form of such a process;

FIG. 3 illustrates diagrammatically still a different form of such a process;

FIG. 4 illustrates diagrammatically another form of the process; and

FIG. 5 illustrates diagrammatically another form of the process.

In FIG. 1 the extractor is illustrated diagrammatically at 1. The pulp therefrom, which will commonly pass a screen having openings from .04 to .09", is led to a vibrating screen 2 which may be of about 50 mesh.

The fiber content of the pulp on a dry weight basis as it comes from the extractor is usually about .5%. It may run as high as 1.2%. This pulp is quite fluid.

On the screen 2 a separation of pulp and free juice occurs. The free juice which generally has a Brix of about 12°, is carried to a collector 3.

On the screen 2 the juice content of the pulp is reduced so that the fiber content is from 3.8 to 4.2% on a dry weight basis.

This contrasts with normal finisher operations in which the juice or liquid content may be reduced to such an extent that the fiber content on a dry weight basis may be 8% or in the case of double finish 9 to 10%.

The pulp discharged from the screen 2 is carried to a mixing container or vessel 4. The pulp is thereafter successively washed on screens 5, 6, 7 and 8, each similar to screen 2, and adjacent which are mixing containers 9, 10 and 11, each similar to the container 4 adjacent the screen 2.

Just prior to passing the pulp to the final screen 8, it is mixed in container 11 with water which enters as indicated diagrammatically at 12. In carrying out the process the amount of water added is generally equal in weight to the weight of the pulp and in the preferred form of the invention this water is condensate from the concentration steps of juice concentration. Such water is desirable because it contains valuable constituents which may serve to give improved flavor more clearly approximating that of fresh juice.

The mixture of pulp and water in the container 11 has the effect of making a mixture having a much reduced fiber content as compared to the pulp itself which passes from the screen 7. The fiber content in the container 11 after mixture with the water will be in the neighborhood of 2% on a dry weight basis.

The water retained in the pulp on the screen has a content of the water soluble solids and when the water from 12 is admixed there is a distribution of the soluble material between the water from the screen 7 and the new water so that when the pulp is drained on screen 8 as is later described, a large proportion of the dissolved solids will go off in the liquid which is drained from the pulp and is carried by the line 13 to the container 10.

The pulp which is finally discarded will of course have a high water content and this water content will have a small amount of dissolved material. However, at the completion of the process the amount is sufficiently small so that it is not economically feasible to have a further washing of the pulp.

The liquid and the pulp mixed in the container 11 are then deposited on the screen 8. There, without pressing or maceration, the water is separated and, carrying with it dissolved solids, is carried by line 13 to the container 10 for the next preceding step of the process. The liquid at this stage generally has a Brix of from 2 to 3°.

The liquid carried away with the pulp from screen 8 will have the same Brix as the liquid carried by line 13 but as pointed out above further washing would not produce a commensurate return of solids and would not be economically practical.

The liquid is mixed in container 10 with the pulp from screen 6. It is then deposited on screen 7 and the liquid is drained and carried away through the line 14 to the next preceding mixing container 9. The liquid at this point will have a Brix of from 4 to 6°.

The pulp from the screen 6 has a fiber content of from 3.8 to 4.2% on a dry weight basis and the admixture of this pulp and the liquid drained from screen 8 will produce a mixture having about 2% fiber on a dry weight basis.

Upon admixture the solids dissolved in the water in the pulp from screen 6 having a Brix greater than 4 to 6° will be distributed in the water from screen 8, which has a Brix of from 2 to 3° giving a liquid having the Brix of from 4 to 6° above mentioned.

The mixed pulp and liquid from the container 9 is deposited on the screen 6 and the liquid is drained off without pressing or macerating and is carried by line 15 to the mixing container 4 where it is mixed with the pulp from screen 2.

The pulp from screen 5 has a fiber content on a dry weight basis of from 3.8 to 4.2% and as in the case of containers 10 and 11, the admixture of the pulp from screen 5 and the liquid carried thereby with the less rich liquid from screen 7 causes a redistribution of the dissolved solids in the total liquid so that the drainings from screen 6 will be enriched as indicated.

The mixed pulp and water from the mixing container 4 is deposited on the screen 5 and the liquid is drained therefrom. It is carried by a line 16 to the collector 3. At this point the liquid has a Brix of from 8 to 10° and is substantially free from undesirable quantities of pectin, enzymes and undesirable principles.

The pulp from screen 2 has a fiber content of from 3.8 to 4.2% on the dry weight basis. When admixed in the container 4 the mixture has a fiber content of about 2% on a dry weight basis. There is the same distribution of dissolved solids from the liquid in the pulp from screen 2 in the less rich liquid from screen 6 as is indicated for containers 9, 10 and 11.

In FIG. 2 there is illustrated diagrammatically a continuous countercurrent multiple extraction process to take the place of the successive screens shown in FIG. 1. A continuous belt 17 carries perforated buckets 18 around drums 19 being driven in the direction of the arrow 20. Pulp from a conveyor 21 is loaded into the buckets 18 as shown and water is introduced at 22 as is indicated diagrammatically. The water employed is the same as the water introduced at 12 in FIG. 1. It is introduced directly onto the pulp 23 in the bucket 18, then filters down as indicated by arrows 24 to the next lower bucket in line and eventually runs to the collector 25. From the collector it is then led for processing or mixing with the juice as in the process indicated in FIG. 1.

As the water filters down through the successive buckets 18 it extracts the solids from the pulp in said buckets, increasing in concentration as it goes down. The pulp carried by the buckets 18 is discharged onto conveyor 26.

Another form of the invention makes use of a centrifugal classifier for the extraction. Such a classifier is indicated diagrammatically in FIG. 3. It consists of a hollow, unperforated cone 27 which is mounted on spiders 28 for rotation on a hollow shaft 29. At the larger end of the cone is a dam 30. Water, as at 12 in the process of FIG. 1, is introduced at the smaller end as indicated at 31 of the cone and the pulp is introduced as indicated by arrow 32 at the larger end of the cone. The screw 33, which is rotating at a speed different from that of the cone 27, carries the solids from the large end of the cone upwardly to be discharged at the smaller end 31. The water flows counter to the flow of the pulp and extracts the water soluble solids therefrom.

After discharge from the classifier the water is mixed with other juice or processed as indicated in connection with the description of the process described in FIG. 1.

Utilizing the process of this invention makes it possible to obtain from 4 to 5% more of the orange solids than with prior processes. The recovery will run well above 90% and the product is substantially free from the undesirable constituents which are found in the juice after the drastic squeezing and maceration of the present day finishing process.

It will be understood that the prime consideration is to avoid the drastic pressing or maceration of the pulp which one finds in the present day finishing processes and which are responsible for freeing from the pulp the undesirable elements which are avoided in the present process.

In carrying out the method of FIG. 1 described above, pulp may be removed from the washing water before adding it to the juice from screen 2. This can be accomplished by centrifuging the liquid as it passes to the collector 3.

It is found that when all of the pulp, which consists primarily of very finely divided pulp, is removed from the wash water in this way, viscosity is reduced and greater stability is achieved.

Many of the benefits of the invention may also be obtained if the orange solids are extracted from the pulp by the washing extraction of this invention if it is accompanied by pressing less drastic than the normal finishing which frees the undesirable elements.

It is possible to extract the juice from the pulp without excessive squeezing and maceration by employing one or more loosely set finishers rather than the gravity separation above described or in combination therewith along with the washing steps of the invention. When this is done a more stable and less viscous product is obtained than that using the conventional double finish and if the wash water is centrifuged to remove the finely divided pulp which is more prevalent in this type of operation than in the screen operation, highly satisfactory results are obtained. In other words, the juice has a high orange solid content consisting of the soluble solids. The extraction of these orange solids from the pulp is more complete than with the conventional double finish and the juice is of higher quality.

In this form of the invention the pulp is subjected to a series of washes between separations. The added wash water picks up a portion of the soluble solids in the water retained in the pulp and the separation of the pulp from the increased quantity of liquid is easier and can be accomplished with less drastic squeezing and with less masceration than would be necessary if the wash water were not added and the extraction of the solids were to be effected by squeezing out the lesser quantity of liquid.

FIG. 4 illustrates such a process diagrammatically in which loosely set finishers are employed in combination with screens.

In carrying out this process the pulp and juice from the extractor are fed through a line 34 to a finisher 35.

In normal finishing the finisher would be set so that the pulp discharged therefrom would consist of 92% juice and 8% fiber on a dry weight basis and the juice separated would be so squeezed and mascerated as to release undesirable constituents as to produce a considerable quantity of finely divided pulp. In the process illustrated in FIG. 4 it is preferred to loosely set the finisher so that the fiber content of the pulp discharged therefrom is 6% on a dry weight basis. This gives a juice with minimal quantities of undesirable constituents and fines.

The juice removed from the pulp is passed through a feed line 36 to a collector or the evaporators.

The pulp is carried through a line 37 to a mixing container 38 where it is mixed with liquid from one of the following screens as set forth below. The mixture of liquid and pulp is deposited on vibrating screen 39 and the liquid which is extracted passes through line 40 back for admixture with the juice from the finisher 35 on its way to the evaporator. This liquor is passed first to a centrifuge 41, which in the preferred form of the invention removes all of the pulp from the liquid so that any finely divided pulp which might have been formed in the finisher or in the handling of the pulp is removed.

The pulp passes successively to screens 42 and 43 and to a second finisher 44 which is likewise loosely set so that the pulp discharged therefrom consists of 6% fiber by dry weight. The water discharged with this pulp will normally contain enough of the orange solids to have a Brix of about 2.45°.

This loose setting as in the case of finisher 35 is less drastic than the normal setting of a finisher to give 8% to 10% fiber on a dry weight basis on the discharge. However, because of the washing of the pulp described below and the presence of the washing water the water soluble solids are removed even more completely than in the normal double finish by the less drastic treatment of the pulp.

In carrying out the process the pulp passing from screen 43 is mixed in a mixing container or chamber 45 with water introduced through a line 46. The addition is comparable to the additions to the process shown in FIG. 1 and described above. The water added makes the amount of water present in the mixture about double that in the pulp before mixing.

The mixture of the water and pulp passes through a line 47 to the finisher 44. The juice from the finisher 44 having a Brix of about 2.45° is carried by a line 48 to a mixing container or chamber 49, where it is mixed with pulp from the screen 42.

This mixture of liquid and pulp is passed through a line 50 to the screen 43. A line 51 carries pulp from the screen 43 to the mixing chamber 45.

The pulp from the screen 42 is carried to the mixing container or chamber 49 by a line 52. The juice drained from the pulp on screen 43 having a Brix of about 3.9° passes through a line 53 to a mixing container or chamber 54 where it is mixed with pulp passing through line 55 from screen 39. The mixture of juice from line 53 and pulp from line 55 is passed from the mixing chamber 54 through line 56 to screen 42.

The juice drained from the pump on screen 42 having a Brix of about 4.5° passes through line 57 to the mixing container or chamber 38 where it is admixed with the pulp coming from the first finisher 35 through the line 37. The mixture passes through line 58 to the screen 39.

In carrying out this process as in the earlier described processes, the pulp passing from the first finisher 35 and from each of the screens 39, 42 and 43 has a high juice or water content. The enriched wash water passing to the mixing container or chamber 38 has a Brix of about 12.25°. It is mixed with the juice passing from screen 42 which has a Brix of 5.55°. The proportions of the mixture are such that when the soluble solids are distributed throughout the sum total of the liquids, the Brix is about 7.4° on equilibrium.

The juice retained in the pulp passing to chamber 54 has a Brix of about 7.4° when it is admixed with the liquid from line 53 at 3.9° Brix, the resulting mixture is the 5.5° Brix liquid which is drained from the screen 42.

The juice retained in the pulp passing to chamber 49 has a Brix of 5.55° and when it is admixed with the juice having a Brix of 2.45° passing from the final finisher 44 through line 48 the Brix of the resulting liquid is 3.9° on reaching equilibrium.

The juice produced by the process above outlined is highly desirable. It contains substantially all of the soluble solids of the fruit and is at low viscosity, particularly when the wash water is centrifuged as at 41 to remove the pulp. The pectin content is slightly higher than that found in juice extracted by the straight washing and gravity separation method of this invention.

The invention can also be carried out without excessive maceration and squeezing of the pulp in a system in which all of the separation is carried out on finishers set loosely as described above. Such a system is shown diagrammatically in FIG. 5.

Here instead of setting the finishers tightly as in the conventional finishing of citrus juice, the finishers are set to give a pulp on discharge having materially less fiber on a dry weight basis where in normal finishing operation the finisher would be set to give 8% fiber on a dry weight basis, the finishers here employed would be set to give a 4 to 6% fiber content on a dry weight basis.

Referring to FIG. 5 it will be noted that the juice passes from the extractors indicated diagrammatically at 59 to a pair of finishers 60 set in parallel. These finishers are set to discharge a pulp consisting of from 4 to 6% fiber on a dry weight basis. The pulp then passes successively to finishers 61, 62, 63 and 64, all set at substantially the same degree of finish.

The pulp is finally discharged from finisher 64 through a line 65. It is introduced into the finisher 64 through a line 66 leading from a mixing container 67 where the pulp has been mixed with water introduced in line 68. Pulp is introduced from the finisher 63 directly into the mixing container 67.

In this form of the invention the full extraction of the water soluble orange solids is possible with the loosely set finisher because of the use of washing water as in other forms of the invention. In the washing steps water is added to double the water content of the pulp and the solids dissolved in the water in the pulp are distributed in the total water content until equilibrium is reached. Then the finishers extract a portion of the water which carries with it some of the solids. This separation is achieved with less pressure and maceration than would be required to extract the solids by removing the undiluted liquid or juice from the pulp. Although not all of the solids are removed the amount retained in the liquid in the discharged pulp is not great and the extraction does not take the undesirable constituents or create large amounts of finely divided pulp.

The liquid extracted from finisher 64 is carried by a line 69 to a mixing container 70 where it is admixed with pulp from finisher 62. The mixture of pulp and liquid from the container 70 passes through line 71 to finisher 63. The liquid separated from the pulp in finisher 63 is carried by line 72 to mixing container 73 where it is admixed with pulp from finisher 61. The mixture is carried from container 73 through line 74 to finisher 62. The liquid extracted from the pulp in finisher 1 passes through line 75 to a centrifuge 76 where pulp is removed. This includes any fines which may have been created in the finishers. The liquid then passes from the centrifuge 76 through a line 77 to a collector tank 78 from which it may be fed to the evaporators. It may at this point be mixed with juice from the primary finishers. This is carried through lines 78, 79 and 80.

In the process of FIG. 5 the liquid from the finisher 64 will be at a Brix of about 1.38°. The liquid from finisher 63 will be at about 3.14° Brix. The liquid from finisher 62 will be at a Brix of about 5.4° and the liquid passing from finisher 61 will be at about 8.3° Brix. The liquid passing from the finisher 60 will be at about 12° Brix.

In this form of the invention as in the other forms described above, the Brix of the liquid passing successively from the finishers 60, 61, 62, 63 and 66 becomes progressively less. This is due to the fact that the pulp carrying this liquid is mixed after each juice separation step with a liquid having a lower Brix. The dissolved solids are thus redistributed in the entire liquid each time the pulp and liquid are mixed. In this way the soluble solids are more completely extracted than is the case when the pulp is merely pressed and macerated as in the conventional extraction methods above described and the undesirable elements are not extracted and the quantity of fines is kept at a low level.

In the form of invention shown in FIG. 5 the removal of the fines in the centrifuge 76 leads to a high quality of juice. The viscosity is lower and the stability is higher than is the case with juices extracted by normal extraction methods. The ratio of water soluble orange solids to water insoluble solids in the juice is higher than in the normally extracted juice.

The product resulting from the practice of the process of this invention is superior to the product of ordinary double finished pulp. It has a lower viscosity which is a measure of its greater stability which is also important in the evaporators when the juice is concentrated juice. It has generally less water insoluble solids and less pectinous material and is much less likely to gel.

Juice resulting from the process illustrated in FIG. 1 in which the washing water has not been centrifuged will, when concentrated, as to 42° Brix, have a viscosity of about 800 centipoises at 40° F. When the wash water has been centrifuged as described the viscosity, when concentrated, as to 42° Brix, will be about 600 centipoises at 40° F.

In the juice made by the process illustrated in FIG. 1, without centrifuging there will be about 235 milligrams per 100 grams of pectinous material, whereas after centrifuging the amount will be as low as 208 milligrams per 100 grams. When the wash water is not centrifuged the water insoluble material in the juice will run about 164 milligrams per 100 grams, while after centrifuging it will be about 125 milligrams per 100 grams.

The juice made in accordance with the process illustrated in FIG. 1 and described above, when concentrated, as to 42° Brix, shows less tendency to gel than any other product when abused by subjecting to 80° F. temperature for 24 hours. At the end of 96 hours of storage at 40° F. the tendency to gel is minimum. This applies also with the concentrated centrifuged product.

Juice made in accordance with the process illustrated in FIG. 4 and described above will, when concentrated, as to 42° Brix, have a viscosity of about 1,000 centipoises at 40° F. Without centrifuging this may run to 1200 centipoises. The pectinous material will run about 290 milligrams per 100 grams, and the water soluble material will run about 140 milligrams per 100 grams. Without centrifuging this might run to about 180 milligrams per 100 grams.

This juice will run about 450 milligrams per 100 grams alcohol insoluble solids, and from about 140–180 milligrams per 100 grams of water insoluble solids depending upon centrifuging.

This juice, when concentrated, as to 42° Brix, shows about the same tendency to gel as that of the method illustrated in FIG. 1 if the washing water is centrifuged, but the tendency is slightly greater where there is no centrifuging.

Juice made in accordance with the process illustrated in FIG. 5, when concentrated, as to 42° Brix, will have a viscosity of about 800 centipoises at 40° F. Without centrifuging this might run as high as 1,000. The tendency to gel if stored at 40° F. for 96 hours will be about the same as the product of FIG. 1, although the tendency to gel if abused by storage at 80° F. for 24 hours is slightly higher than the product made by the method illustrated in FIG. 1. The juice will have a content of about 240 milligrams per 100 grams of pectinous material and about 150 milligrams per 100 grams of water insoluble solids. Alcohol insoluble solids will run about 100 milligrams per 100 grams.

All of the processes illustrated produce pulp of low viscosity, and it appears that this is due in large measure to the removal of the finely divided pulp by centrifuging the washing water.

The ratio of water soluble solids to water insoluble solids is effected to a unique degree, the ratio being higher than in double finished pulp.

In carrying out the process the aqueous liquid need not necessarily be the condensation from concentration of juice and it will be apparent that satisfactory results can be obtained many times using either more or less water than the preferred amount, particularly in cases where the juice is to be concentrated by vacuum or freezing to remove water.

The process has particularly useful application in extracting grapefruit juice because the naringen which lends bitterness to the juice is not as easily extracted in cool water as in warmer water.

The above described steps and processes are given as illustrative of the preferred forms of the invention. These examples must be considered as illustrative only and not restrictive. Reference should be had to the appended claims rather than to the foregoing description to determine the scope of the invention.

We claim:

1. In the process of extracting citrus juice from fruit, the step of separating juice from the pulp without subjecting the pulp to drastic squeezing and maceration followed by successively washing the pulp a plurality of times and separating it from the washing fluid without subjecting the pulp to drastic squeezing and maceration in which the final step comprises washing the pulp with an equal quantity by weight of aqueous liquid condensate from juice concentration susbtantially free of the water soluble constituent of the juice and in which each of said successive washings is done by the washing liquid from the next following washing whereby water soluble constituents in the pulp are separated from the pulp in the washing liquid and combining the washing liquid with the juice separted in the first separation step.

2. In the process of extracting citrus juice from fruit, the step of separating juice from the pulp without subjecting the pulp to drastic squeezing and maceration followed by successively washing the pulp a plurality of times and separating it from the washing fluid without subjecting the pulp to drastic squeezing and maceration, in which the final step comprises washing the pulp with aqueous liquid substantially free of the water soluble constituent of the juice and in which each of said successive washings is done by the washing liquid from the next following washing whereby water soluble constituents in the pulp are separated from the pulp in the washing liquid and combining the washing liquid with the juice separated in the first separation step.

3. In the process of extracting citrus juice from fruit, the step of separating juice from the pulp followed by washing the pulp with an aqueous liquid having a lower concentration of the water soluble constituents of the pulp than occurs in the juice of said fruit and separating it from said washing fluid whereby the water soluble constituents of said pulp are separated from said pulp in said washing liquid and controlling the quantity of said washing liquid to produce a solution of water soluble constituents substantially as high as that of the juice separated in said first step, and combining said washing liquid with the juice separated in the first separation step.

4. In the process of extracting citrus juice from fruit, the production of a solution of water soluble constituents from the fruit having a Brix of approximately 8 to 10°, comprising washing pulp, from which juice has been separated, a plurality of times and separating it from the washing fluid, in which the final step comprises washing said pulp with an equal quantity by weight of aqueous liquid having a Brix of less than 2° and separating said pulp and liquid to produce a solution of about 2 to 3° Brix, and in which the next to the last step comprises washing said pulp with the liquid from said last washing and separating said pulp and liquid to produce a solution having a Brix of from 4 to 6° and in which the next preceding step involves washing said pulp with the washing liquid from the next following step and separating said pulp and liquid to produce a solution having a Brix of from 6 to 8° and in which the next preceding step involves washing said pulp with the washing liquid from the next following step and separating the pulp and liquid to produce a solution having a Brix of from 8 to 10°.

5. In the process of extracting citrus juice from fruit, the step of separating free juice from the pulp without subjecting the pulp to drastic squeezing and maceration and then washing said pulp with an equal quantity by weight of water having a lower concentration of water soluble constituents of said pulp than the juice separated in said first separation step, by subjecting said pulp to a countercurrent wash with said water whereby water soluble constituents in the pulp are separated from the pulp in the washing water without subjecting the pulp to drastic squeezing and maceration and combining the washing water with the juice separated in the first separation step and concentrating the combined washing water and juice by evaporation.

6. In the process of extracting citrus juice from fruit, the step of separating free juice from the pulp without subjecting the pulp to drastic squeezing and maceration and then washing said pulp with water having a lower concentration of water soluble constituents of said pulp than the juice separated in said first separation step by subjecting said pulp to a countercurrent wash with said water whereby water soluble constituents in the pulp are separated from the pulp in the washing water without subjecting the pulp to drastic squeezing and maceration and combining the washing water with the juice separated in the first separation step.

7. In the process of extracting citrus juice from fruit, the step of separating juice from the pulp followed by successively washing the pulp a plurality of times and separating it from the washing liquid in which the final step comprises washing the pulp by mixing it with a quantity of aqueous liquid substantially equal to the quantity of liquid in the pulp and substantially free of the water soluble constituents of the juice and in which each of said successive washings is done with the washing liquid from the next following washing and in a quantity substantially equal to the quantity of liquid retained in the pulp to be washed whereby water soluble constituents in the pulp are separated from said pulp in the washing liquid and separating finely divided pulp from said washing liquid and then combining said washing liquid with the juice separated in the first separation step, the separation of the pulp from the washing liquid being accomplished by pressing the mixture of washing liquid and pulp to expel liquid and leave a residue having from 4 to 6% fiber on a dry weight basis.

8. In the process of extracting citrus juice from fruit, the step of separating juice from the pulp followed by successively washing the pulp a plurality of times and separating it from the washing fluid in which the final step comprises washing the pulp by mixing it with aqueous liquid substantially free of water soluble constituents of the juice and in which each of said successive washings is done by mixing the pulp with the washing liquid from the next following washing whereby water soluble constituents in the pulp are separated from said pulp in said washing liquid and separating finely divided pulp from said washing liquid and then combining said washing liquid with the juice separated in the first separation step, the separation of the pulp from the washing liquid being accomplished by pressing the mixture of washing liquid and pulp to expel liquid and leave a residue having from 4 to 6% fiber on a dry weight basis.

9. In the process of extracting citrus juice from fruit, the step of separating juice from the pulp followed by successively washing the pulp a plurality of times and separating it from the washing fluid in which the final step comprises washing the pulp by mixing it with aqueous liquid substantially free of the water soluble constituents of the juice and in which each of said successive washings is done by mixing the pulp with the washing liquid from the next following washing whereby water soluble constituents in the pulp are separated from said pulp in said washing liquid and separating finely divided pulp from said washing liquid and then combining the washing liquid with the juice separated in the first separation step.

10. In the process of extracting juice from citrus fruit the steps of separating juice from the pulp and then extracting water soluble solids from the wet pulp by admixing said pulp with water having a lower concentration of said soluble solids than the juice retained in said pulp to create a solution of intermediate concentration of said soluble solids and separating a portion of said solution from the pulp and admixing it with the juice intially removed from the pulp.

11. In the process of extracting juice from citrus fruit the steps of separating juice from the pulp and then extracting water soluble solids from the wet pulp by admixing said pulp with water having a lower concentration of said soluble solids than the juice retained in said pulp in a quantity about equal to that of the retained juice to create a solution of intermediate concentration of said soluble solids and separating about one half of said solution from the pulp and admixing it with the juice initially removed from the pulp and concentrating said admixed juice and solution.

12. A method of treating food material characterized by having juice and pomace components comprising, the steps of separating the juice and pomace components from each other, and washing the pomace component with condensate obtained by evaporation of juice of said food material.

13. A method of treating food material characterized by having juice and pomace components comprising, the steps of separating said juice and pomace components from each other, subjecting said separated juice component to evaporation, condensing the gaseous product of said evaporation to provide a condensate, and counterflowing said pomace and said condensate to afford successive washings of said pomace with said condensate to remove and entrain soluble solids from said pomace in said condensate and thus afford a low solids juice of increasing soluble solids content in successive washings, thereby to afford initial washing of said pomace with said low solids juice of maximum soluble solids content and final washing of said pomace with said condensate.

14. A method of treating food material characterized by having juice and pomace components comprising, the steps of separating said juice and pomace components from each other, washing said pomace with liquid condensate from juice concentration to provide a low solids juice, and separating said low solids juice and the washed pomace.

15. In a method of preparing concentrated citrus juice from citrus fruit in which the peel is separated from the fruit, the juice extracted from the pomace, and the extracted juice and pomace separated from each other, the steps comprising, washing said pomace with liquid condensate from juice concentration to produce a low solids juice, and separating said low solids juice and the washed pomace.

16. In a method of preparing concentrated citrus juice from citrus fruit in which the peel is separated from the fruit, the juice extracted from the pomace, and the extracted juice and pomace separated from each other, the steps comprising, washing said pomace with liquid condensate from juice concentration to provide a low solids juice, separating said low solids juice and the pomace, mixing said low solids juice with juice of said citrus fruit, and concentrating said mixture.

References Cited by the Examiner
UNITED STATES PATENTS

| | | | |
|---|---|---|---|
| 1,167,006 | 1/16 | Monti | 99—105 |
| 1,529,431 | 3/25 | Gusmer | 99—105 |
| 2,419,545 | 4/47 | Gray et al. | 99—105 |
| 2,382,407 | 8/45 | Erickson et al. | 99—105 |
| 2,647,058 | 7/53 | Schapiro | 99—205 X |

A. LOUIS MONACELL, *Primary Examiner.*

ABRAHAM H. WINKELSTEIN, *Examiner.*